(12) United States Patent
Morinaga et al.

(10) Patent No.: US 7,457,634 B2
(45) Date of Patent: Nov. 25, 2008

(54) COMMUNICATION TERMINAL, COMMUNICATION STATE INFORMATION PROVIDING SYSTEM, AND METHOD OF PROVIDING COMMUNICATION STATE INFORMATION

(75) Inventors: Yasuo Morinaga, Yokohama (JP); Masaharu Nakatsuchi, Yokohama (JP); Toshio Kaneda, Yokohama (JP); Satoshi Takase, Yokohama (JP); Nobuaki Sasao, Yokohama (JP); Masashi Itoh, Tokyo (JP)

(73) Assignees: NTT DoCoMo, Inc., Tokyo (JP); NEC Corporation, Tokyo (JP)

( * ) Notice: Subject to any disclaimer, the term of this patent is extended or adjusted under 35 U.S.C. 154(b) by 366 days.

(21) Appl. No.: 11/177,440

(22) Filed: Jul. 11, 2005

(65) Prior Publication Data

US 2006/0014561 A1    Jan. 19, 2006

(30) Foreign Application Priority Data

Jul. 12, 2004    (JP) ............................ P2004-205191

(51) Int. Cl.
*H04M 1/00* (2006.01)

(52) U.S. Cl. ................ 455/550.1; 455/41.2; 455/552.1; 455/553.1; 455/556.1; 455/404.2; 455/456.1; 455/67.13; 455/566; 455/563; 705/23; 398/91

(58) Field of Classification Search .............. 455/552.1, 455/41.2, 550.1, 519, 404.2, 456.1, 466, 455/67.13, 566, 563
See application file for complete search history.

(56) References Cited

U.S. PATENT DOCUMENTS

| | | | | |
|---|---|---|---|---|
| 5,796,436 A * | 8/1998 | Shioi et al. ............. 375/240.12 |
| 5,802,017 A * | 9/1998 | Sato et al. ...................... 369/2 |
| 5,963,863 A * | 10/1999 | Berggren ..................... 455/445 |
| 6,035,282 A * | 3/2000 | Tamai et al. .................. 705/23 |
| 6,130,880 A * | 10/2000 | Naudus et al. .............. 370/235 |
| 6,131,170 A * | 10/2000 | Oishi et al. .................... 714/18 |
| 6,229,825 B1 * | 5/2001 | Nitta et al. .................. 370/498 |
| 7,076,269 B2 * | 7/2006 | Konishi et al. ........... 455/552.1 |
| 7,274,299 B2 * | 9/2007 | Osman .................... 340/686.1 |
| 7,298,714 B2 * | 11/2007 | Foster ........................ 370/315 |
| 7,359,676 B2 * | 4/2008 | Hrastar .................... 455/67.11 |
| 7,359,724 B2 * | 4/2008 | Torvinen .................... 455/518 |
| 7,366,524 B2 * | 4/2008 | Watanabe et al. ........... 455/458 |
| 7,369,862 B2 * | 5/2008 | Kim et al. ................. 455/456.3 |
| 7,389,105 B2 * | 6/2008 | Ala-Laurila et al. ......... 455/406 |
| 2001/0009853 A1 * | 7/2001 | Arimitsu ..................... 455/434 |

(Continued)

FOREIGN PATENT DOCUMENTS

EP      1 363 425 A2    11/2003

(Continued)

*Primary Examiner*—Marceau Milord
(74) *Attorney, Agent, or Firm*—Oblon, Spivak, McClelland, Maier & Neustadt, P.C.

(57) ABSTRACT

The communication state information providing system comprises a cellular phone of an information provider, and an information providing device having an information receiving unit for receiving, via a wireless LAN, the communication state information transmitted from the cellular phone, a communication state information storage unit for storing the communication state information received by the information receiving unit associated with the phone number specifying the cellular phone, and an information transmitting unit for transmitting the communication state information stored in the communication state information storage unit to a destination associated with the phone number of the cellular phone.

10 Claims, 7 Drawing Sheets

U.S. PATENT DOCUMENTS

| | | | |
|---|---|---|---|
| 2004/0110535 A1 | 6/2004 | Koskelainen et al. | |
| 2004/0203800 A1* | 10/2004 | Myhre et al. | 455/445 |
| 2005/0159136 A1* | 7/2005 | Rouse et al. | 455/412.1 |

FOREIGN PATENT DOCUMENTS

| | | |
|---|---|---|
| JP | 2001-224071 | 8/2001 |
| JP | 2001-313723 | 11/2001 |
| JP | 2002-271837 | 9/2002 |
| JP | 2003-115795 | 4/2003 |
| JP | 2003-333654 | 11/2003 |
| WO | WO 97/21315 | 6/1997 |

* cited by examiner

| INCOMING/ OUTGOING TYPE | EVENT TIME/DATE | EVENT CODE | COMMUNICATION EVENT NAME |
|---|---|---|---|
| OUTGOING | 2004/06/21 12:00:00 | 0010 | UNDER COMMUNICATION |
| OUTGOING | 2004/06/21 12:15:00 | 0020 | COMPLETION OF COMMUNICATION |
| ⋮ | ⋮ | ⋮ | ⋮ |

*Fig.4*

| PHONE NUMBER | INCOMING/ OUTGOING TYPE | EVENT TIME/DATE | EVENT CODE | COMMUNICATION EVENT NAME |
|---|---|---|---|---|
| 090-XXXX-0001 | OUTGOING | 2004/06/21 12:00:00 | 0010 | UNDER COMMUNICATION |
| 090-XXXX-0001 | OUTGOING | 2004/06/21 12:15:00 | 0020 | COMPLETION OF COMMUNICATION |
| ⋮ | ⋮ | ⋮ | ⋮ | ⋮ |

Fig.5

| DESTINATION PHONE NUMBER | REGISTERED PHONE NUMBER |
|---|---|
| 090-XXXX-0001 | 090-XXXX-0002/ 090-XXXX-0003/ 090-XXXX-0004 |
| 090-XXXX-0002 | 090-XXXX-0001/ 090-XXXX-0003/ 090-XXXX-0004/ 090-XXXX-0005 |
| 090-XXXX-0003 | 090-XXXX-0001/ 090-XXXX-0002 |
| 090-XXXX-0004 | 090-XXXX-0002/ 090-XXXX-0003/ 090-XXXX-0005 |
| ⋮ | ⋮ |

COMMUNICATION TERMINAL, COMMUNICATION STATE INFORMATION PROVIDING SYSTEM, AND METHOD OF PROVIDING COMMUNICATION STATE INFORMATION

BACKGROUND OF THE INVENTION

1. Field of the Invention

The present invention relates to communication terminals, communication state information providing systems, and methods of providing communication state information.

2. Related Background Art

An exemplary system for providing individual information such as location information of communication terminals to other terminals, is such that a server, after having received and accumulated location information of mobile communication terminals of information providers, transmits the information to mobile communication terminals of information requesters as needed (see, for example, Japanese Patent Laid-Open Publication No. 2002-271837). Recently, on the other hand, in communication terminals such as mobile communication terminals, there has been offered communication, using a plurality of communication methods, via a single communication terminal, furnished with a plurality of communication functions of different communication methods installed thereon (see Japanese Patent Laid-Open Publication No. 2001-224071).

When providing individual information of a communication terminal having a plurality of communication functions to other terminals as stated above, the communication terminal transmits, using any communication function among the plurality of the communication functions, the individual information to a server or the like which is connected to a network. In this case, if the communication state of the communication terminal is desired to be provided as the individual information, it is easy to grasp the communication state of the communication function on the network to which the server is connected, but grasping the communication state pertaining to the other communication functions poses difficulties. Such tendency is made remarkable for communication terminals having various provided communication functions such as wireless LAN communication, mobile communication, short-distance wireless communication, or the like.

In the event that it is possible to grasp only the communication state of a portion of the communication functions, as thus described, in some cases the communication state of one communication function is in a non-connection state such as "incoming call waiting state", for example, while other functions are in use, so that it might be not possible to clearly know the communication state of the communication terminal. As a result, there might be caused disagreement between the actual communication state of the communication terminal having a plurality of communication functions and the communication state to be provided to other terminals.

SUMMARY OF THE INVENTION

It is, therefore, an object of the present invention, which has been made in view of the above-mentioned problems, to provide a communication terminal, a communication state information providing system, and a method of providing communication state information which can notify the accurate communication state of a communication terminal having a plurality of communication functions.

In order to solve the above-mentioned problems, a communication terminal of the present invention comprises: a first communication means for communicating with the outside; a second communication means for communicating with the outside over a network; a communication state detection means for detecting the communication state of the first communication means; a communication state notification means for notifying the second communication means of the communication state information which indicates the communication state, wherein the second communication means transmits the communication state information over the network.

According to such a communication terminal, since the communication terminal having the first and the second communication means detects the communication state of the first communication means and notifies the second communication means of the communication state information, and the second communication means notifies the communication state information over the network, so that the communication state of the first communication means which is not using a specific network can be reliably notified to the network.

In addition, it is preferred for the communication state detection means to detect whether or not the first communication means is being connected with the outside as the communication state of the first communication means. In this case, since the information as to whether or not the first communication means is being connected can be notified to the network, the network can grasp, collectively, whether or not the communication terminal is busy (a state of being connected).

Alternatively, the communication state information providing system to the present invention comprises the above-mentioned communication terminal and an information providing device having: an information receiving means for receiving the communication state information transmitted by the communication terminal over the network; a communication state information storage means for storing the communication state information received by the information receiving means associated with communication terminal specification information which specifies the communication terminal; and an information transmitting means for transmitting the communication state information stored in the communication state information storage means to a destination associated with the communication terminal specification information.

Alternatively, a method of providing communication state information according to the present invention comprises: a first communication step in which the first communication means of the communication terminal communicates with the outside; a second communication step in which the second communication means of the communication terminal communicates with the outside over the network; a communication state detection step in which the communication terminal detects the communication state of the first communication means; a communication state notification step in which the communication terminal notifies the second communication means of the communication state information indicating the communication state; a communication state transmitting step in which the communication terminal transmits the communication state information over the network by the second communication means; an information receiving step in which the information providing device receives the communication state information transmitted by the communication terminal over the network; a communication state information storage step in which the information providing device stores the communication state information received in the information receiving step associated with communication terminal specification information which specifies the communication terminal; and an information transmitting step in which the information providing device transmits the communication state information stored in the communication state information storage step to a destination associated with the communication terminal specification information.

According to such a communication state information providing system and a method of providing communication state information, after the communication terminal having the first and the second communication means has detected the communication state of the first communication means, the communication terminal notifies the second communication means of the communication state information, and the second communication means transmits the communication state information to the network. In addition, an information providing device receives the communication state information transmitted by the communication terminal, stores the communication state information associated with communication terminal specification information into the communication state information storage means, and transmits the communication state information to a destination preliminarily associated with the communication terminal specification information. In this manner, communication state of a communication means which is not using a specific network can also be correctly grasped via the specific network, and the communication state information can be provided to a destination.

DESCRIPTION OF THE PREFERRED EMBODIMENTS

Embodiments of the present invention will be described in reference to the drawings. Here, in the drawings, like elements are indicated by like reference numerals, and repetitive explanation will be omitted.

Figure 1:
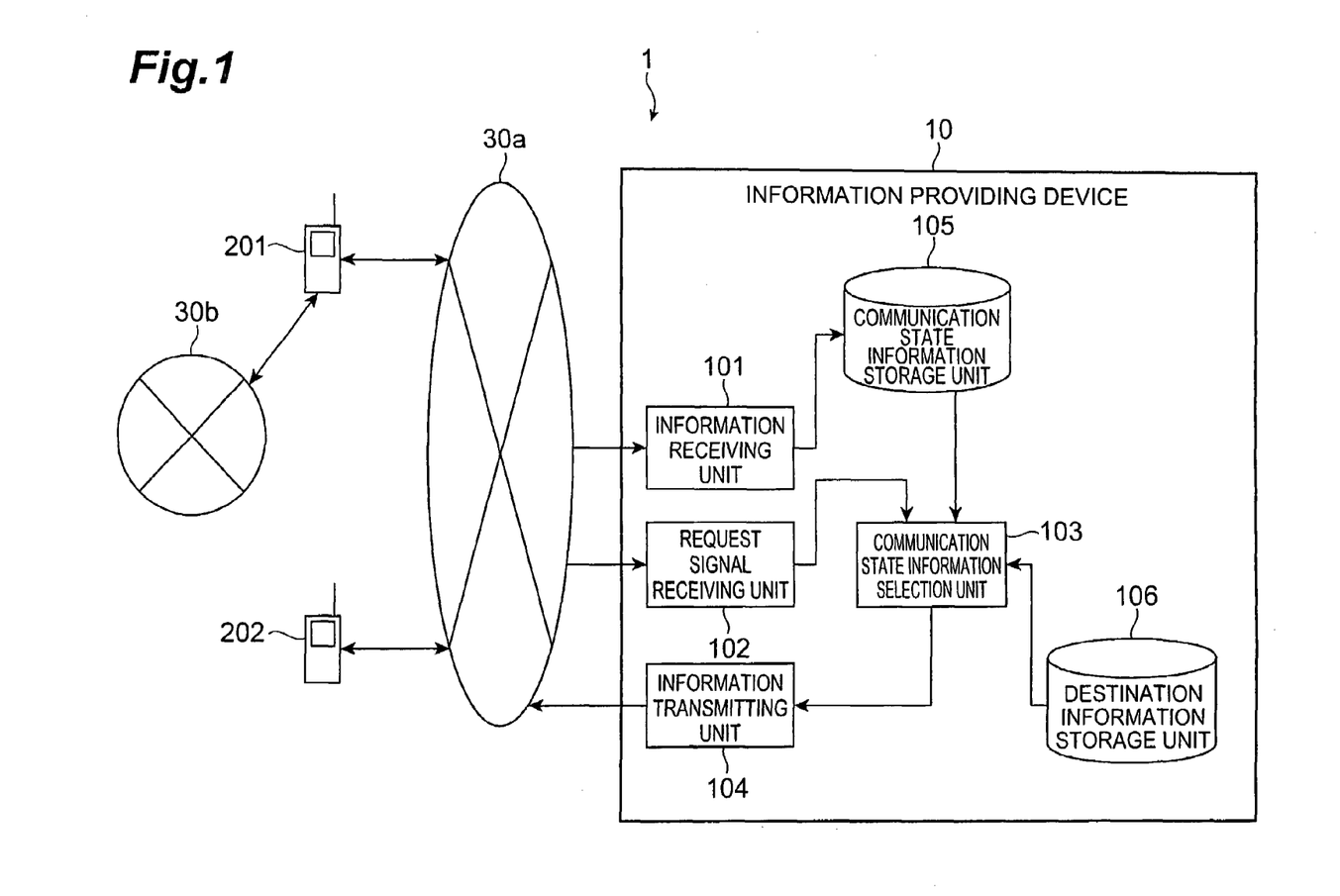
FIG. 1 is a schematic block diagram of a communication state information providing system according to the present embodiment.

FIG. 1 is a schematic block diagram of a communication state information providing system according to the present embodiment. The communication state information providing system 1 according to the present embodiment comprises an information providing device 10 and cellular phones 201 and 202. In addition, the cellular phone 201 is configured to be connectable with the information providing device 10 via a wireless LAN 30$a$, and also connectable with a mobile communication network 30$b$.

The cellular phones 201 and 202 are information communication terminals capable of data communication as well as voice communication. In the present embodiment below, the cellular phone 201 is one that a user being intended to provide communication state information indicating the communication state uses, whereas the cellular phone 202 is one that a user being intended to obtain communication state information of the cellular phone 201 uses.

Figure 2:
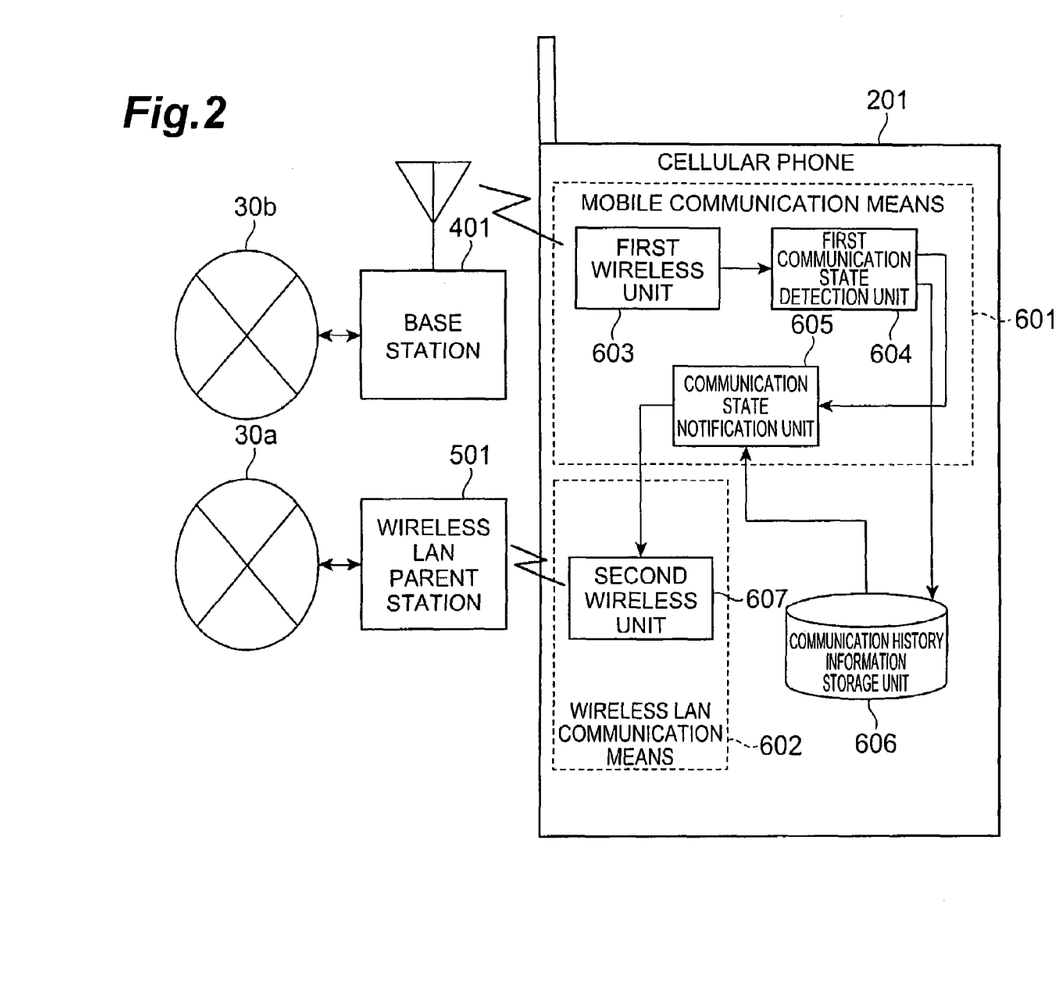
FIG. 2 is a schematic block diagram illustrating a preferred embodiment of the cellular phone of FIG. 1.

FIG. 2 is a schematic block diagram illustrating a preferred embodiment of the cellular phone 201. A base station 401 is a relay unit for connecting the cellular phone 201 to the mobile communication network 30$b$ by transmitting and receiving radio signals to and from the cellular phone 201. The base station 401 is a relay unit for connecting the cellular phone 201 to the wireless LAN 30$a$ by transmitting and receiving radio signals to and from the cellular phone 201.

The cellular phone 201 comprises, as its functional components, a mobile communication means 601 including a first wireless unit (first communication means) 603, a first communication state detection unit (communication state detection means) 604, and a communication state notification unit (communication state notification means) 605; and a wireless LAN communication means 602 including a second wireless unit (second communication means) 607; and a communication history information storage unit 606. In the following, the components of the cellular phone 201 will be described in detail.

The first wireless unit 603 performs data communication including voice communication, electronic mail transmission and reception, and file transmission and reception with external communication devices (not shown) connected to the mobile communication network 30$b$, via the base station 401 and the mobile communication network 30$b$. In addition, the first wireless unit 603 performs data communication using mobile communication methods such as PDC (Personal Digital Cellular), W-CDMA (Wideband-Code Division Multiple Access) mode, TDMA (Time Division Multiple Access), or the like.

The first communication state detection unit 604 serves as a component for detecting a change in the communication state of the first wireless unit 603. Specifically, upon submission of a connection request signal to the mobile communication network 30$b$ from the first wireless unit 603, through actuation a predefined operation such as depression of the call button on the cellular phone 201, the first communication state detection unit 604 determines that the communication state of the first wireless unit 603 has been changed to "under communication" by detecting the connection request signal. In addition the first communication state detection unit 604 also determines that the communication state has been changed to "under communication" by detecting a call signal transmitted by the mobile communication network 30$b$ to the cellular phone 201.

Furthermore, upon submission of a disconnection signal to the mobile communication network 30$b$ from the first wireless unit 603, through actuation a predefined operation such as depression of the end-button, when the first wireless unit 603 is in connection with external communication devices, the first communication state detection unit 604 determines that the communication state of the first wireless unit 603 has been changed to "completion of communication" by detecting the disconnection signal. Here, the first communication state detection unit 604 may be configured so as to determine the change of the communication state by detecting predefined operations such as depression of the call button or the end button, or by detecting a busy tone when a disconnecting operation is performed at the external communication device of the other party of communication.

Figure 3:
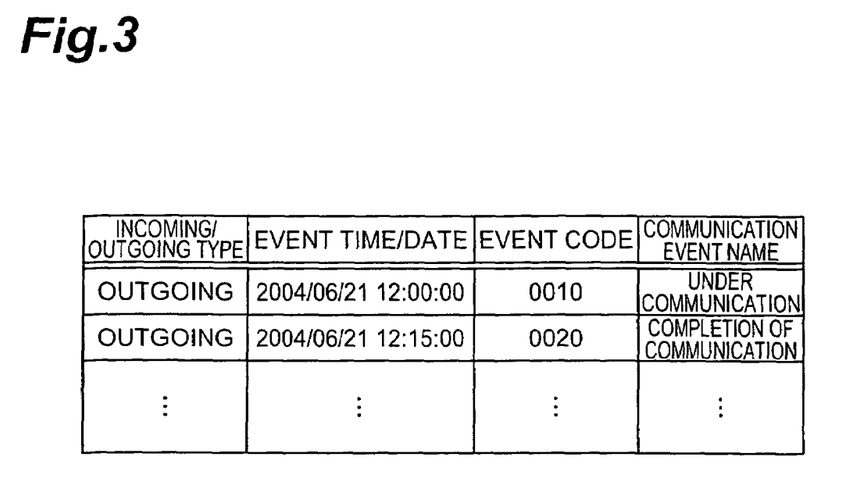
FIG. 3 is a diagram that shows the configuration of the data stored in the communication history information storage of FIG. 2.

In addition, the first communication state detection unit 604 stores the communication state information indicating the detected communication state into the communication history information storage unit 606. FIG. 3 illustrates a diagram that shows the configuration of the data stored in the communication history information storage unit 606. As shown in the figure, an event code "0010" and a communication event name "under communication" constituting the communication state information, an event time/date "2004/06/21 12:00:00" meaning the time and date of detecting the change of the communication state, and an incoming/outgoing type "outgoing", indicating whether the connection request, incoming, or disconnection signals in the cellular phone 201 are incoming or outgoing, are stored associated with each other.

The communication state notification unit 605 reads the communication state information stored in the communication history information storage 606 by the first communication state detection unit 604, upon detection by the first communication state detection unit 604, and notifies the information to the second wireless unit 607. According to the example of FIG. 3, the communication state notification unit 605 notifies the data composed of the incoming/outgoing type "outgoing", the event time/date "2004/06/21 12:00:00", the event code "0010", and the communication event name "under communication", to the second wireless unit 607.

Referring to FIG. 1 again, the second wireless unit 607 performs data communication including voice communication, electronic mail transmission and reception, and file transmission and reception with external communication devices (not shown) connected to the wireless LAN 30a, via a wireless LAN parent station 501 and a wireless LAN 30a. Here, the second wireless unit 607 performs data communication based on wireless LAN communication methods defined by IEEE (The Institute of Electrical and Electronic Engineers) 802.11a, IEEE 802.11c, or the like. Furthermore, the second wireless unit 607 transmits data including the communication state information notified from the communication state notification unit 605, and the phone number "090-XXXX-0001" of the cellular phone 201, to the information providing device 10, via the wireless LAN 30a.

The information providing device 10 is physically configured as a computer system comprising a CPU (central processing unit), a memory, input devices such as a mouse or a keyboard, a display device such as the one usually referred to as "display" simply, a storage device such as a hard-disk. In addition, the information providing device 10 comprises, as functional components, an information receiving unit 101 (information receiving means), a request signal receiving unit 102, a communication state information selection unit 103, an information transmitting unit 104 (information transmitting means) and a communication state information storage unit 105 (communication state information storage means), and a destination information storage unit 106, as shown in FIG. 1. In addition, the information providing device 10 is configured to be capable of transmitting and receiving information from and to the cellular phones 201 and 202 via the wireless LAN 30a. The components of the information providing device 10 will be described below.

Figure 4:
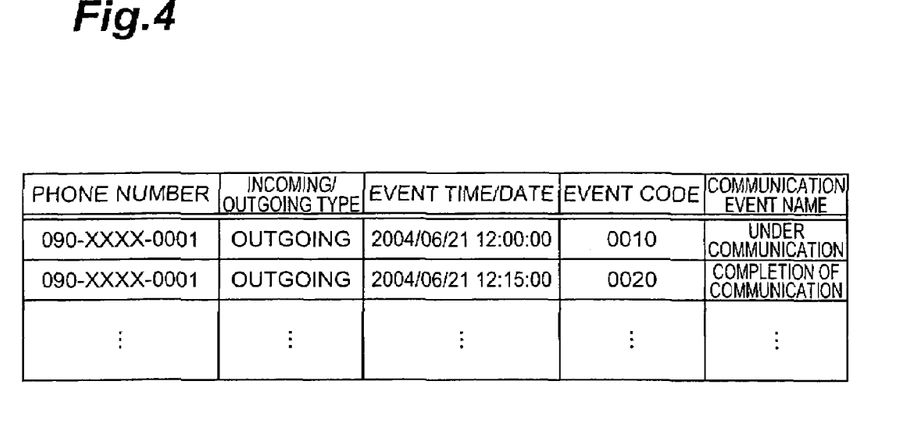
FIG. 4 is a diagram that shows the configuration of the data stored in the communication state information storage of FIG. 1.

The information receiving unit 101 receives data including the communication state information transmitted from the second wireless unit 607 of the cellular phone 201, and the phone number (communication terminal specification information) of the cellular phone 201. In addition, the information receiving unit 101 associates the received data with the phone number of the cellular phone 201 and stores it into communication state information storage unit 105. FIG. 4 is a diagram that shows the configuration of the data thus stored in the communication state information storage unit 105. The information receiving unit 101, upon receipt of an event code "0010" and a communication event name "under communication" constituting the communication state information, an event time/date "2004/06/21 12:00:00", and an incoming/outgoing type "outgoing", as shown in the figure, stores the data associated with the phone number "090-XXXX-0001" of the cellular phone 201.

Referring to FIG. 1 again, the request signal receiving unit 102 receives a request signal for requesting the communication state information with regard to the cellular phone 201 from the cellular phone 202. Included in the request signal are: a phone number "090-XXXX-0002" which specifies the cellular phone 202 of the information requester, a phone number "090-XXXX-0001" which specifies the cellular phone 201 of the information provider, and a desired time information. Having received the request signal, the request signal receiving unit 102 outputs the phone number of the cellular phone 202 and the phone number of the cellular phone 201, and the desired time information, to the communication state information selection unit 103. Here, a desired time information is provided for the information requestor to obtain the information of the cellular phone 201 at the time specified by the desired time information.

In addition, the communication state information selection unit 103 selects the latest information among the communication state information of the cellular phone 201 stored in the communication state information storage unit 105, according to the request signal received at the request signal receiving unit 102. In other words, the communication state information selection unit 103 searches data which have a phone number coinciding with the phone number "090-XXXX-0001" of the information provider included in the request signal, and the latest event time/date. According to the example of FIG. 4, the communication state information selection unit 103, upon receipt of the phone number "090 XXXX-0001" of the cellular phone of information provider as the request signal data, selects data including the phone number "090-XXXX-0001" and the event time/date, "2004/6/21 12:15:00". The communication state information selection unit 103 performs the above-mentioned selection at the time specified by the desired time information included in request signal. Referring to FIG. 1 again, the communication state information selection unit 103 outputs the data which includes the selected communication state information to the information transmitting unit 104, together with the phone number of the cellular phone 202 which is the information requester.

In addition, the communication state information selection unit 103 outputs data including the communication state information to the information transmitting unit 104 actively, regardless of receiving or not receiving the request signal from the cellular phone 202. Specifically, the communication state information selection unit 103 repeatedly refers to the communication state information storage unit 105 with a predefined timing, sequentially selects and reads the data including the latest event time/date with regard to each phone number. The communication state information selection unit 103 then specifies the destination phone number corresponding to the phone number included in each data that has been read, in reference to the destination information storage unit 106.

Figure 5:
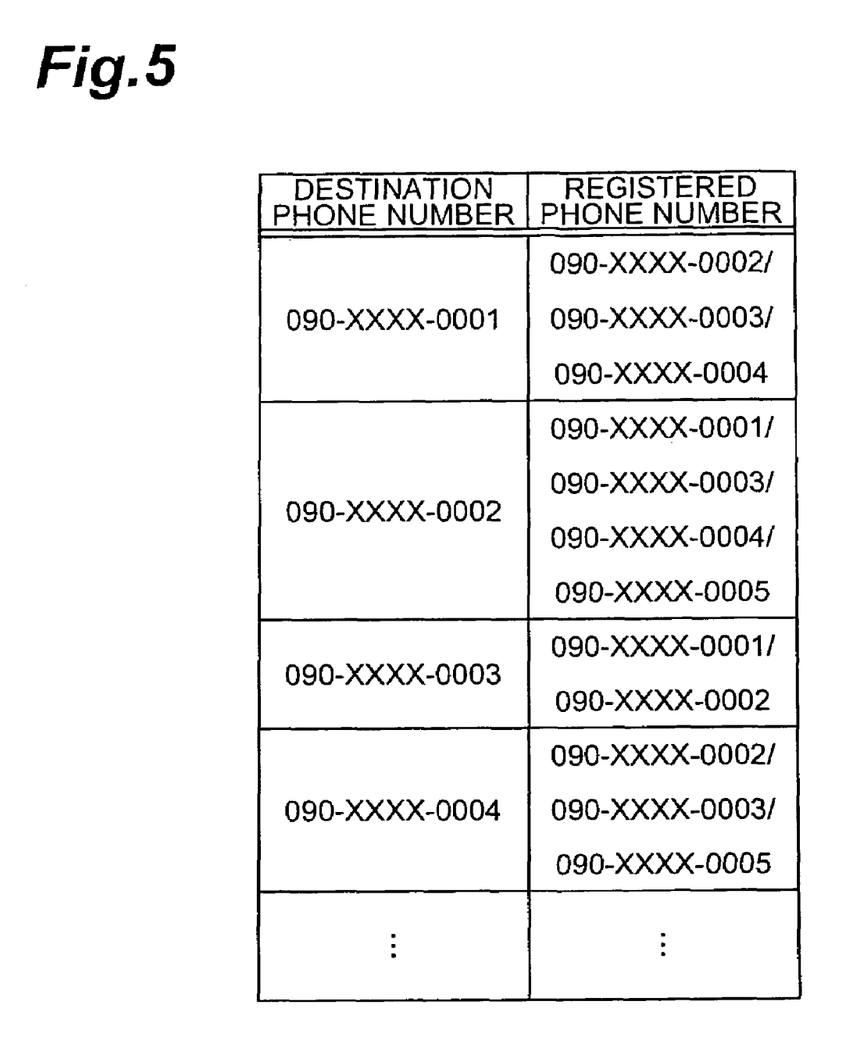
FIG. 5 is a diagram that shows the configuration of the data stored in the destination information storage of FIG. 1.

Here, FIG. 5 is a diagram that shows the configuration of the data stored in the destination information storage unit 106. According to the figure, a plurality of registered phone numbers "090-XXXX-0001/090-XXXX-0003/090-XXXX- 0004/09-XXXX-0005" for specifying the cellular phone of the communication state information provider are stored associated with the destination phone number "090-XXXX-0002" which specifies the cellular phone of the information destination.

In this case, having read the data including the latest communication state information with regard to each phone number from the communication state information storage unit 105, the communication state information selection unit 103 searches data which includes a relevant phone number as a registered phone number, by referring the destination information storage unit 106. The communication state information selection unit 103 specifies, based on the searched data, the destination phone number corresponding to the relevant phone number. According to the example of FIG. 5, for example, having read, from communication state information storage unit 105, data including the latest communication state information with regard to the cellular phone 201, the communication state information selection unit 103 specifies "090-XXXX-0002" and "090-XXXX-0003" as the destination phone numbers including the phone number "090-XXXX-0001" of the cellular phone 201 as the registered phone number. The communication state information selection unit 103 outputs, to information transmitting unit 104, the combination of the data including the communication state information for respective phone numbers of information providers and the destination phone numbers corresponding to each data.

The information transmitting unit 104 transmits, via the wireless LAN 30a, data which includes the communication state information output from the communication state information selection unit 103, to the cellular phone which is the information destination. Specifically, upon reception of the data including the communication state information and the destination phone number "090-XXXX-0002" from the communication state information selection unit 103, the information transmitting unit 104 transmits the data to the cellular phone 202.

Figure 6:
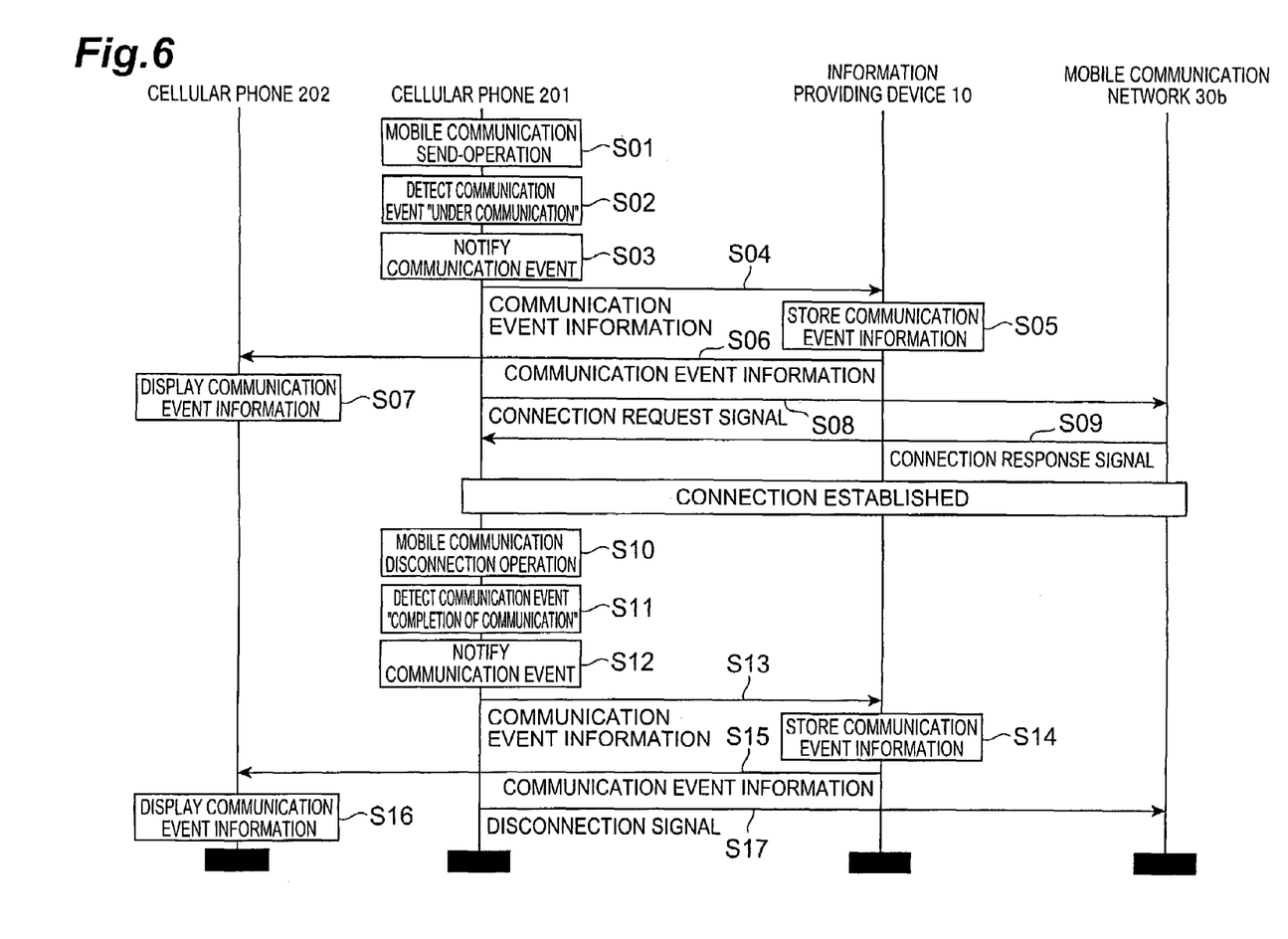
FIG. 6 is a sequence diagram illustrating the operation of the communication state information providing system according to the present embodiment.

Subsequently, the operation of the communication state information providing system according to the present embodiment will be described, together with the method of providing the communication state information according to the embodiments of the present invention. FIG. 6 is a sequence diagram illustrating the operation of the communication state information providing system 1.

First, in the cellular phone 201, a connection process with the external communication device connected to the mobile communication network 30b is started by the user's predefined operation such as depression of the call button (step S01). As a result, the first communication state detection unit 604 detects that the communication state of the first wireless unit 603 has changed to "under communication" (step S02). Subsequently, data including the detected communication state information is notified to the second wireless unit 607 from the communication state notification unit 605 (step S03).

Figure 7:
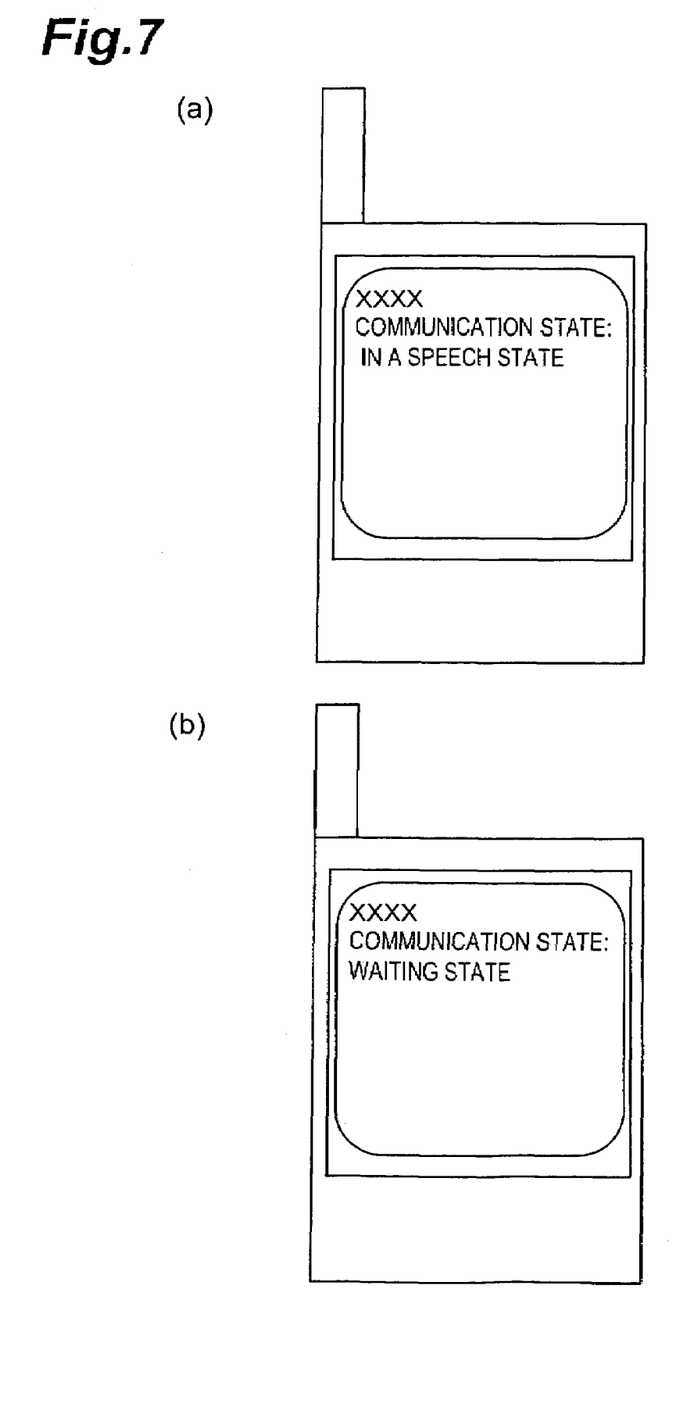
FIG. 7 illustrates an exemplary information output in the cellular phone of the destination.

In response to this, the data including the communication state information notified by the second wireless unit 607 is transmitted to information providing device 10 together with the phone number of the cellular phone 201 (step S04). The information receiving unit 101 of the information providing device 10 receives the data including transmitted communication state information and stores the data associated with the phone number of the cellular phone 201 into the communication state information storage unit 105 (step S05). Subsequently, after the communication state information selection unit 103 has read the latest communication state information for respective phone numbers stored in the communication state information storage unit 105, and specified the destination phone number corresponding to each of the phone numbers, the information transmitting unit 104 transmits the data including the communication state information to the destination phone number (step S06). Thus, the communication state of the cellular phone 201 is output as "under communication" on the information output means, such as the display, of the destination cellular phone (for example, see FIG. 7(a), step S07).

On the other hand, in response to the send-operation in the cellular phone 201, a connection request signal is transmitted to the mobile communication network 30b from the first wireless unit 603 (step S08). Thus, after a predefined session connection establishment process has been performed in the mobile communication network 30b, a connection response is sent to the first wireless unit 603 from the external communication device of the other party of communication (step S09). In this manner, connection between the cellular phone 201 and the external communication device is established.

Subsequently, in the cellular phone 201, a disconnection process with the external communication device is started by the user's predefined operation such as a depression of the end-button (step S10). As a result, the first communication state detection unit 604, detects that the communication state of the first wireless unit 603 has been changed to "completion of communication" (step S11). Subsequently, the data including the detected communication state information is notified to the second wireless unit 607 from the communication state notification unit 605 (step S12).

In response to this, the data including the notified communication state information is transmitted, by the second wireless unit 607, to the information providing device 10 together with phone number of the cellular phone 201 (step S13). The information receiving unit 101 of the information providing device 10 receives the data including the transmitted communication state information and stores the data associated with the phone number of the cellular phone 201 into the communication state information storage unit 105 (step S14). Subsequently, by a procedure similar to step S06, the information transmitting unit 104 transmits the data including the communication state information to the destination phone number (step S15). Thus, the communication state of the cellular phone 201 is output as "waiting state" on the information output means, such as the display, of the destination cellular phone (for example, see FIG. 7(b), step S16).

On the other hand, depending on the speech termination operation in the cellular phone 201, a disconnection signal is transmitted to the mobile communication network 30b from the first wireless unit 603 (step S17), whereby a predefined session disconnection process is performed in the mobile communication network 30b and the connection between the cellular phone 201 and the external communication device is disconnected.

According to the communication state information providing system 1 described above, after the cellular phone 201 having two types of communication means, i.e. the first wireless unit 603 and the second wireless unit 607, has detected the communication state of the first wireless unit 603, it notified the communication state information to the second wireless unit 607, then the second wireless unit 607 in turn transmits the information to the wireless LAN 30a. In addition, the information providing device 10 receives the communication state information transmitted from the cellular phone 201, and stores the information associated with the phone number of the cellular phone 201 into the communication state information storage unit 105, then transmits the communication state information to the destination preliminarily associated with the phone number of the cellular phone 201. Thus, the communication state of a communication means not using a specific network can be accurately grasped via the specific network, and the communication state information can be provided to a destination in need of the information. As a result, the communication state of a communication terminal having a plurality of types of communication means can be managed and provided collectively.

In addition, since the information as to whether or tot the first wireless unit 603 is in connection can be notified to the wireless LAN 30*a*, the wireless LAN 30*a* side can collectively grasp whether or not the cellular phone 201 is busy (in use).

Note that the present invention is not limited to respective embodiments. For example, the communication method of the first wireless unit 603 and the second wireless unit 607 of the cellular phone 201 is not limited to a particular one, and other communication methods such as infrared-ray, non-contact IC card, Bluetooth (registered trademark), or the like may be employed. In addition, the cellular phone 201 may comprise three or more communication functions.

In addition, the communication terminal of the information provider, not being limited to a particular one, may employ PDA (Personal Digital Assistants), PHS (Personal Handyphone System), personal computers, or the like.

What is claimed is:

1. A communication state information providing system, comprising:
    a communication terminal including
        first communication means for communicating with a first outside system over a mobile communication network;
        second communication means for communicating with a second outside system over a wireless LAN;
        communication state detection means for detecting any change in a communication state of the first communication means; and
        communication state notification means for notifying the second communication means of communication state information, which indicates the change in the communication state of the first communication means,
        wherein the second communication means transmits the communication state information over the wireless LAN; and
    an information providing device including
    information receiving means for receiving the communication state information transmitted by the communication terminal over the network;
    communication state information storage means for storing the communication state information received by the information receiving means associated with communication terminal specification information, which specifies the communication terminal; and
    information transmitting means for transmitting the communication state information stored in the communication state information storage means to a destination associated with the communication terminal specification information.

2. The communication state information providing system according to claim 1, wherein the communication state detection means detects whether or not the first communication means is being connected with the first outside system as the communication state of the first communication means.

3. The communication state information providing system according to claim 1, wherein the information providing device further includes a request signal receiving means for receiving, from another client terminal, a request signal that includes a specified time for requesting the communication state information of the client terminal corresponding to the specified time.

4. The communication state information providing system according to claim 3, wherein the information providing device further includes communication state information selection means for selecting the stored communication state information according to the received request signal, and
    wherein the information transmitting means transmits the selected communication state information to the another client terminal.

5. The communication state information providing system according to claim 1, wherein the client terminal further includes communication history information storage means for storing the detected change in the communication state of the first communication means.

6. A method of providing communication state information comprising:
    communicating, by first communication means of a communication terminal, with a first outside system over a mobile communication network;
    communicating, by second communication means of the communication terminal, with a second outside system over a wireless LAN;
    detecting, by the communication terminal, any change in a communication state of the first communication means;
    notifying, by the communication terminal, the second communication means of communication state information indicating the change in the communication state of the first communication means;
    transmitting the communication state information over the wireless LAN by the second communication means;
    receiving, by an information providing device, the communication state information transmitted by the communication terminal over the wireless LAN;
    storing, by the information providing device, the received communication state information, associated with communication terminal specification information that specifies the communication terminal; and
    transmitting, by the information providing device, the stored communication state information to a destination associated with the communication terminal specification information.

7. The method of providing communication state information according to claim 6, further comprising:
    receiving, by the information providing device, a request signal from another client terminal including a specified time, for requesting the communication state information of the client terminal corresponding to the specified time.

8. The method of providing communication state information according to claim 7, further comprising:
    selecting, by the information providing device, the stored communication state information according to the received request signal,
    wherein the step of transmitting, by the information providing device, comprises transmitting the selected communication state information to the another client terminal.

9. The method of providing communication state information according to claim 6, further comprising:
    storing, in the communication terminal, the detected change in the communication state of the first communication means.

10. A communication state information providing system, comprising:
    a communication terminal including a first communication unit configured to communicate with a first outside system over a mobile communication network;

a second communication unit configured to communicate with a second outside system over a wireless LAN;

a communication state detection unit configured to detect any change in a communication state of the first communication unit; and a communication state notification unit configured to notify the second communication unit of communication state information, which indicates the change in the communication state of the first communication unit, wherein the second communication unit transmits the communication state information over the wireless LAN; and an information providing device including an information receiving unit configured to receive the communication state information transmitted by the communication terminal over the network;

a communication state information storage unit configured to store the communication state information received by the information receiving unit associated with communication terminal specification information, which specifies the communication terminal; and an information transmitting unit configured to transmit the communication state information stored in the communication state information storage unit to a destination associated with the communication terminal specification information.

* * * * *